S. T. E. & J. E. WHITE.
PHONOGRAPH.
APPLICATION FILED OCT. 14, 1910.
993,931.
Patented May 30, 1911.
2 SHEETS—SHEET 1.
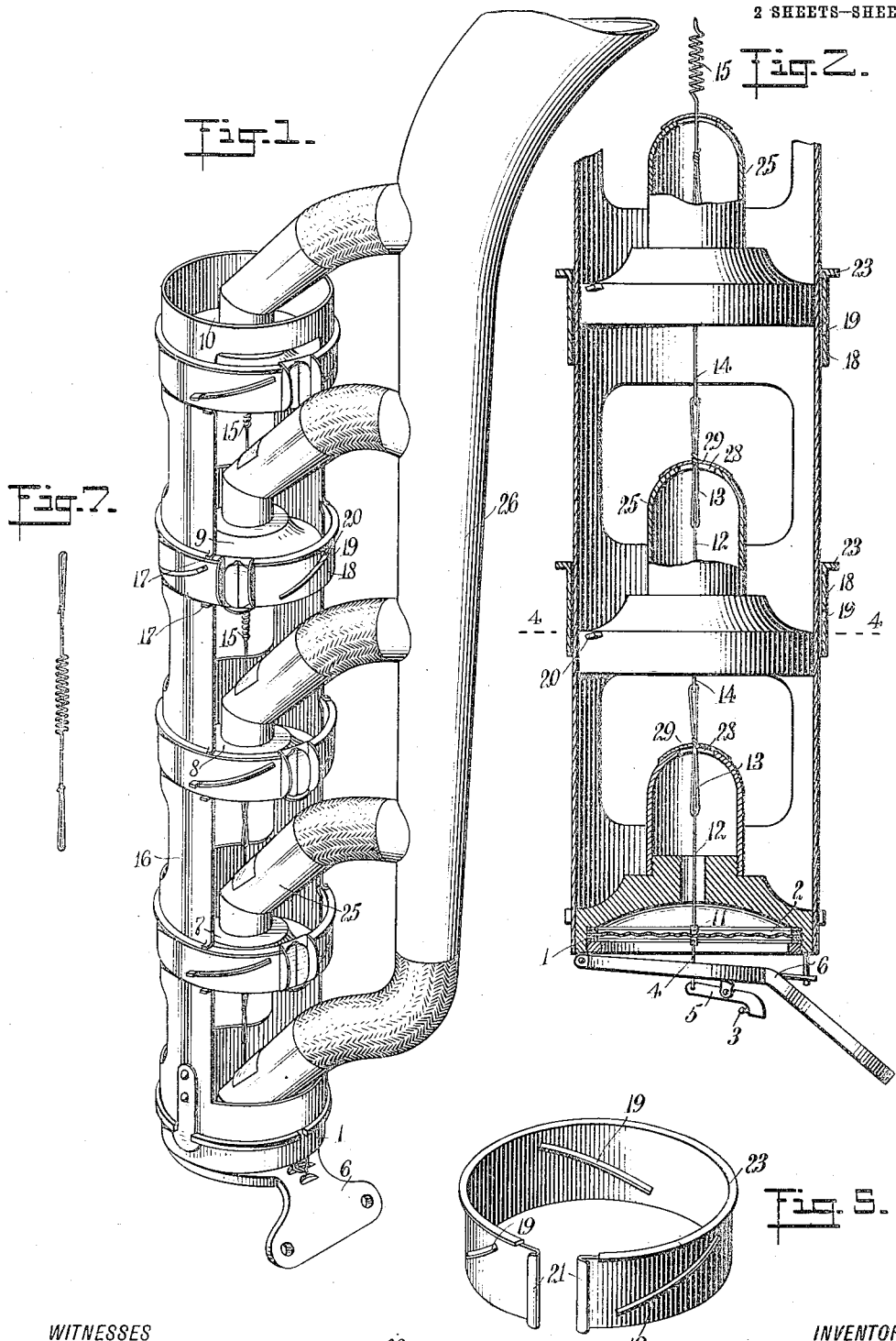
WITNESSES
INVENTORS
Septimus T. E. White
John E. White
BY
Munn & Co.
ATTORNEYS

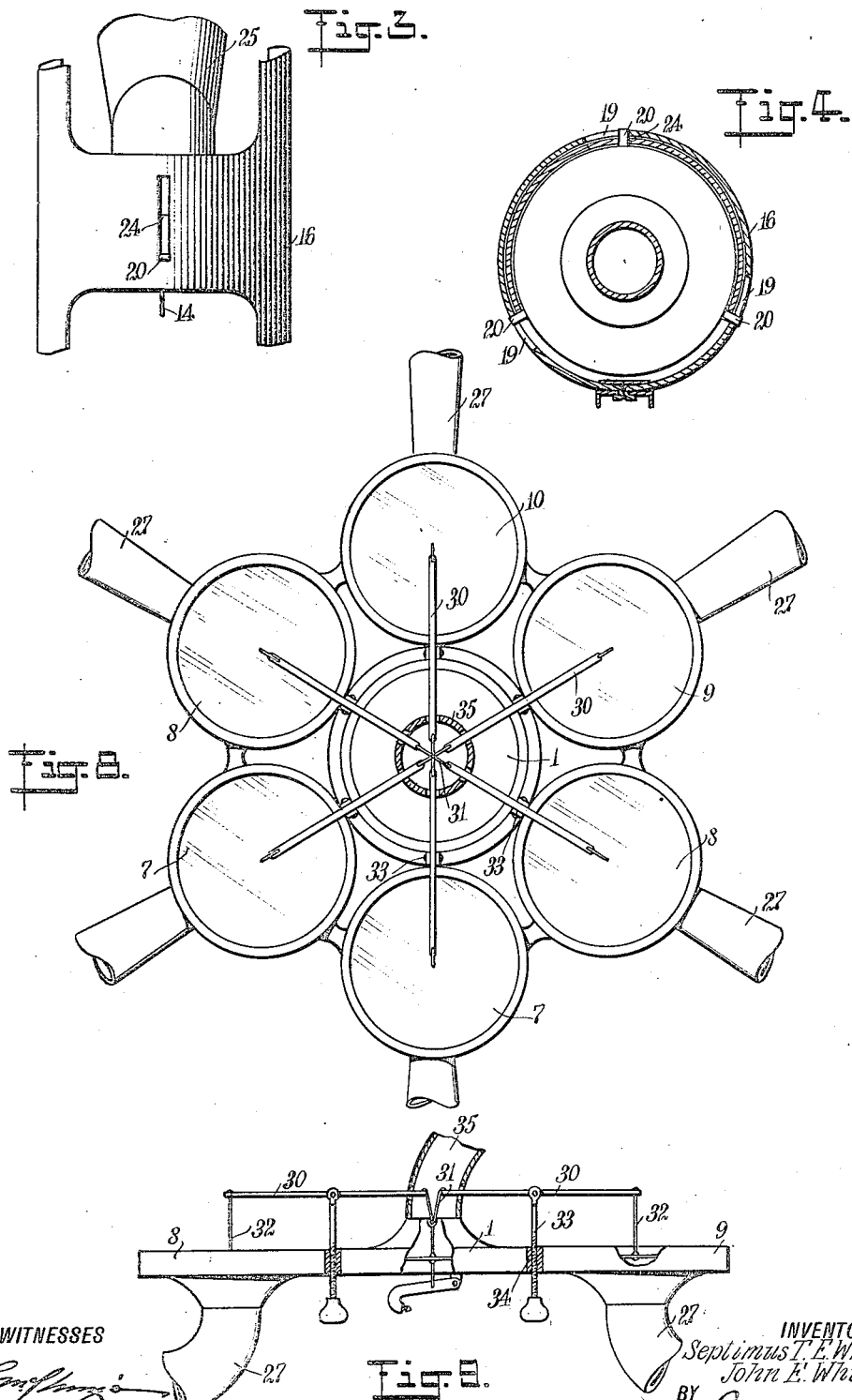

UNITED STATES PATENT OFFICE.

SEPTIMUS T. E. WHITE, OF OKLAHOMA, OKLAHOMA, AND JOHN E. WHITE, OF NEW YORK, N. Y.

PHONOGRAPH.

993,931.  Specification of Letters Patent.  Patented May 30, 1911.

Application filed October 14, 1910. Serial No. 587,019.

*To all whom it may concern:*

Be it known that we, SEPTIMUS T. E. WHITE, a citizen of the United States, and a resident of Oklahoma city, in the county of Oklahoma and State of Oklahoma, and JOHN E. WHITE, a citizen of the United States, and a resident of the city of New York, borough of the Bronx, in the county and State of New York, have invented a new and Improved Phonograph, of which the following is a full, clear, and exact description.

This invention relates to an improvement in phonographs, whereby the effect of the vibrations imparted to the stylus by the disk or cylinder or any other type of recording tablet is modified by a plurality of diaphragms, thereby increasing the distinctness and volume of the sound.

An object of this invention is to provide an attachment for a phonograph in which a plurality of diaphragms are connected to a single stylus, whereby the effect of the movement of the stylus is amplified, with means for varying the number of diaphragms which will be operative at any time.

A further object of this invention is to provide an attachment for a phonograph which includes a plurality of sounding diaphragms or sounding boxes, connected either in series or multiple, with a primary sounding box or diaphragm.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a perspective view showing one form of our device, in which the sounding boxes are connected in series; Fig. 2 is a fragmentary vertical section of the form shown in Fig. 1; Fig. 3 is an enlarged detail fragmentary view of the frame with one of the rings removed to show the underlying structure; Fig. 4 is a horizontal section on the line 4—4 of Fig. 2; Fig. 5 is a perspective detail view of one of the adjusting rings. Fig. 6 is a detail perspective view of the lock for securing the ends of one of the adjusting rings together; Fig. 7 is an enlarged view of one of the connections between a pair of juxtaposed diaphragms or sounding boxes; Fig. 8 is a fragmentary plan view of another form of our invention, in which the auxiliary sounding boxes are shown connected in multiple with the primary sounding box; and Fig. 9 is a fragmentary view in elevation, partly in section, of the form shown in Fig. 8.

Referring more particularly to the separate parts of the device, 1 indicates the main or primary sounding box, which is provided in either form of our invention. The sounding box is provided with a diaphragm 2 of any suitable structure, which is adapted to simulate the vibrations of a style 3 by being operatively connected thereto by means of a connecting member, such as a wire 4, and a style holder 5. The style may be held in engagement with a record tablet, such as a cylinder or disk, in any suitable manner, as by means of a pivoted weighted lever 6, which is commonly found in several makes of phonographs now on the market. As far as we are aware, the motion of the style has up to this time been transmitted to but a single sounding box and the diaphragm thereof. In our invention, we connect a plurality of other auxiliary sounding boxes 7, 8, 9 and 10 to the primary sounding box 1, in such a manner that the diaphragm 2 thereof will operate the diaphragm of the auxiliary sounding boxes, so as to cause them to vibrate and thus amplify and intensify the sound of the original sounding box. These sounding boxes may be connected in series, as illustrated in Figs. 1 to 4, or in multiple, as illustrated in Figs. 8 and 9. The advantage of the multiple system over the series system is that if a single intermediate sounding box, or the connections thereof, should become out of order, it would not disturb the action of the other sounding boxes. On each of the diaphragms, there are provided lugs 11, which extend from opposite sides of the diaphragms, and having openings therein, through which are inserted the connecting wires from the style 3 to the first diaphragm, and from the preceding diaphragms to the succeeding diaphragms. As will be seen by reference to Fig. 2, the connections are shown in the form of wires 12, 13 and 14, having interlocking loops formed in their ends, so as to permit a relative movement of the wires, to bring the succeeding diaphragm or diaphragms into operative connection with the preceding diaphragm or diaphragms. In the case of the last few of the sounding boxes, for instance 9 and 10, these connections are provided with springs 15, which permit a slight relative adjustment of the sounding boxes after they have once been operatively connected together. This prevents the breakage of the connections in case some of the preceding connections are adjusted after the succeeding connections have been tightened up.

For the purpose of supporting the various sounding boxes in spaced relation, there is provided a frame 16, which may be of any suitable structure, and is provided with lugs 17 engaging the opposite sides of adjusting rings 18. There are preferably three of these lugs to each side of each ring, so as to form a tri-point support determining a plane. These rings are provided with cam or screw slots 19, in which extend projections 20 on the sounding boxes 7 to 10, in the form shown in Figs. 1 to 7. The rings 18 may be of any suitable structure, but a preferred form is illustrated in Figs. 5 and 6, which is shown as consisting of a band having the ends turned over, as at 21, to form locking joints with a clip 22, which is adapted to be inserted over the edges of the band and engage the turned-over ends 21, so as to secure the ends of the band together. The ring is also preferably provided with a circular flange 23, which permits it to be readily grasped and manipulated. The projections 20 on the sounding boxes pass through vertical slots 24 in the casing or frame 16, thereby preventing the sounding boxes from becoming out of register with each other when manipulated relative to each other, and to the frame 16. It will thus be seen that by rotating the adjusting rings 18, each sounding box can be operatively connected with the preceding sounding box by tightening the connection between them, so that the vibrations of the preceding diaphragm will be transmitted to the succeeding diaphragm. In case all of the connections are tight, every diaphragm will vibrate when the style 3 vibrates. The sounding boxes may be connected in series by suitable outlet conduits 25, to a common horn 26, as illustrated in Fig. 1, or they may be connected to separate and distinct horns 27, as illustrated in the form shown in Figs. 8 and 9. By reason of the construction of the form shown in Figs. 1 to 7, the wire connections must pass through openings 28 in the outlet conduits 25. These openings are closed as much as possible by means of flexible coverings 29, which may be of any suitable material, such as adhesive tape, rubber or the like, so as to keep the sound in the conduits. In the form shown in Figs. 8 and 9, the vibrations of the main or primary sounding box 1 are transmitted from this diaphragm to the diaphragms of the auxiliary sounding boxes grouped around it, by means of individual transmitting connections. These connections may be of any suitable form, and are shown as comprising levers 30 pivoted intermediate their ends and connected by flexible wires 31 and 32, respectively, to the diaphragms of the main and the auxiliary sounding boxes. In order that any one or all of these auxiliary sounding boxes may be thrown into or out of operative connection with the main sounding box, the pivotal supports for the levers 30 are shown adjustable, and in this case, are illustrated as being formed of rods 33, adjustably connected by screw-threaded connection with a frame 34 in the form of an annular ring. In this latter form, the main sounding box may or may not be provided with an outlet conduit 35, which may be connected in series, with the other conduits, to a common horn, or to a separate individual horn.

The operation of the device will be readily understood when taken in connection with the above description. In either form, the machine is so located on the frame of the phonograph that the style 3 will engage the cylinder, disk, or other form of record tablet, and thus produce either a record on the record tablet or reproduce a song, speech, or other collection of sounds by vibrations of the diaphragm of the primary or main sounding box 1. In the form shown in Figs. 1 to 8, any number of the successive sounding boxes may be operatively connected successively to the main sounding box 1 so as to have their diaphragms vibrated simultaneously with the vibrations of the main diaphragm. A simple turn of any one of the rings 18 disconnects or connects the succeeding sounding box or boxes with the preceding sounding box or boxes. If any one of the preceding boxes are disconnected, those following will naturally also be operatively disconnected from the style 3. In the form shown in Figs. 8 and 9, where the sounding boxes are shown arranged in multiple, any or all of the auxiliary sounding boxes can be operatively connected to the main sounding box by simply adjusting their pivoted screws 33. It will thus be seen that the vibrations produced in the main sounding box can be modified and intensified by adding to the effect of the main sounding box the effect of one or more auxiliary sounding boxes.

While we have shown two embodiments of our invention, we do not wish to be limited to the specific details thereof, but desire to be protected in various changes, modifications and alterations which may come within the scope of the appended claims.

Having thus described our invention, we claim as new and desire to secure by Letters Patent:—

1. The combination with a main sounding box, of means adapted to engage a record tablet to transmit sound impulses between said record tablet and said main sounding box, one or more auxiliary sounding boxes adapted to have the vibrations of the one imparted to the other, connections between said main sounding box and said auxiliary sounding boxes for transmitting the vibrations of the one to the other, and means for throwing said connections into and out of active relation with said sounding boxes.

2. A phonograph attachment, comprising a plurality of sounding boxes operatively connected to a single style, the latter being adapted to transmit sound vibrations between said sounding boxes and a tablet, and means for operatively disconnecting one or more of said sounding boxes from said style.

3. A phonograph attachment, comprising a plurality of sounding boxes, connections between the diaphragms of said sounding boxes adapted to transmit the vibrations of one to the others, and means for controlling the connections between said diaphragms.

4. A phonograph attachment, comprising a single style, a plurality of sounding boxes operatively connected to said style, said style being adapted to transmit sound vibrations between a record tablet and said sounding boxes, and means for selectively disconnecting any number of said sounding boxes from said style.

5. The combination with a style, of a plurality of sounding boxes arranged in series, means for connecting each sounding box with the next adjoining sounding box, so that the vibrations of the one will be transmitted to the other, and individual means for varying the connection between said sounding boxes.

6. The combination with a style, of a series of sounding boxes, one of said sounding boxes being directly connected to said style, loose connections between said sounding boxes, and means for tightening said loose connections, whereby said sounding boxes may be operatively connected together, so that the vibrations of one will be transmitted to the others.

7. The combination with a style, of a series of sounding boxes, one of said sounding boxes being directly connected to said style, loose connections between said sounding boxes, and means for tightening said loose connections, whereby said sounding boxes may be operatively connected together, so that the vibrations of one will be transmitted to the others, some of said connections having a spring located therein.

8. The combination with a style, of a sounding box having a diaphragm operatively connected to said style, a plurality of sounding boxes having their diaphragms loosely connected in series with said first-mentioned diaphragm, and individual means for varying the tension on the connection between said diaphragms, whereby one or more of said second-mentioned diaphragms can be operatively connected to said first-mentioned diaphragm for the purpose of reproducing the vibrations of said style.

9. The combination with a casing, of a series of sounding boxes arranged in spaced relation in said casing, rings rotatably mounted on said casing and having cam slots therein, lugs on said sounding boxes engaging said cam slots, whereby the rotation of said rings will vary the relative position of said sounding boxes, and means for operatively connecting said sounding boxes together, so that the vibrations of the one may be transmitted to one or more of the others.

10. The combination with a casing, of a series of sounding boxes arranged in spaced relation in said casing, rings rotatably mounted on said casing and having cam slots therein, lugs on said sounding boxes engaging said cam slots, whereby the rotation of said rings will vary the relative position of said sounding boxes, and loose connections between said sounding boxes, which may be tightened by the manipulation of said rings to operatively connect said sounding boxes together, so that the vibrations of one will be transmitted to the others.

In testimony whereof we have signed our names to this specification in the presence of two subscribing witnesses.

SEPTIMUS T. E. WHITE.
JOHN E. WHITE.

Witnesses for Septimus T. E. White:
  A. L. WELSH,
  J. M. OWEN.

Witnesses for John E. White:
  HORATIO WHITING,
  PHILIP D. ROLLHAUS.